US012209608B2

(12) United States Patent
Moss et al.

(10) Patent No.: US 12,209,608 B2
(45) Date of Patent: *Jan. 28, 2025

(54) ROD CONNECTOR SYSTEM AND METHODS OF USE

(71) Applicant: House of Atlas, LLC, Evanston, IL (US)

(72) Inventors: Jason Moss, Libertyville, IL (US); Alan Arthur Ford, Sturgis, MI (US)

(73) Assignee: House of Atlas, LLC, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,256

(22) Filed: Aug. 25, 2023

(65) Prior Publication Data

US 2023/0407897 A1    Dec. 21, 2023

Related U.S. Application Data

(63) Continuation of application No. 17/411,763, filed on Aug. 25, 2021, now Pat. No. 11,773,888.

(51) Int. Cl.
*F16B 7/18*    (2006.01)
(52) U.S. Cl.
CPC ................................. *F16B 7/182* (2013.01)
(58) Field of Classification Search
CPC .......... F16B 7/182; F16B 7/185; F16B 7/187; E04G 1/06; A47H 1/022
See application file for complete search history.

(56) References Cited

U.S. PATENT DOCUMENTS

| 2,233,901 | A | * | 3/1941 | Scacchetti | ................. E04G 1/06 |
| | | | | | 446/87 |
| 2,400,941 | A | | 5/1946 | Mcfarlane | |
| 2,703,724 | A | | 3/1955 | Frank | |
| 3,406,443 | A | | 10/1968 | De Ridder | |
| 4,484,831 | A | | 11/1984 | Hanson, Jr. | |
| 4,701,065 | A | | 10/1987 | Orosa | |
| 4,919,561 | A | * | 4/1990 | Kee | ......................... F16B 12/40 |
| | | | | | 5/907 |

(Continued)

OTHER PUBLICATIONS

Screen captures from YouTube video clip entitled "RotatorRod—What's in the Box 2015", uploaded on May 7, 2015 by user RotatorRod, 2 pages. Retrieved from Internet: <https://www.youtube.com/watch?v=7FBC1dN4Euw>.

(Continued)

*Primary Examiner* — Lee A Holly
(74) *Attorney, Agent, or Firm* — Fitch, Even, Tabin & Flannery LLP (57) ABSTRACT

A rod connector is provided including a disc portion, a first shaft portion and a second shaft portion. The disc portion has a first side configured to engage a first rod and a second side configured to engage a second rod. The first shaft portion extends from the first side of the disc portion and includes threads along at least a portion of the length thereof for engaging threads of the first rod to draw the first rod into engagement with the disc portion. The second shaft portion extends from the second side of the disc portion and includes threads along at least a portion of the length thereof for engaging threads of the second rod to draw the second rod into engagement with the disc portion.

19 Claims, 5 Drawing Sheets

(56) References Cited

U.S. PATENT DOCUMENTS

| | | | |
|---|---|---|---|
| 4,923,319 | A | 5/1990 | Dent |
| 6,073,642 | A | 6/2000 | Huang |
| 6,840,702 | B2 | 1/2005 | Ko |
| 7,887,069 | B2 * | 2/2011 | Bilmayer ................ B62D 5/22 |
| | | | 280/771 |
| 9,021,627 | B2 | 5/2015 | Parker |
| 9,140,286 | B2 | 9/2015 | Dent |
| 9,556,893 | B2 | 1/2017 | Dent |
| 11,773,888 | B2 * | 10/2023 | Moss .................... A47H 1/022 |
| | | | 29/525.11 |
| 2007/0175167 | A1 | 8/2007 | Allen |
| 2012/0187062 | A1 | 7/2012 | Sadler, III |

OTHER PUBLICATIONS

Screen captures from YouTube video clip entitled "Rotator Rod—Installing the Curved Shower Rod for Small Bathrooms", uploaded on Feb. 27, 2019 by user RotatorRod, 2 pages. Retrieved from Internet: <https://www.youtube.com/watch?v=y1EB_9IEXW8>.

Screen capture from YouTube video clip entitled "Rotator Rod's ability to flip in and makes this curved shower rod is Perfect for small bathrooms!" uploaded on Jun. 14, 2021 by user RotatorRod, 1 page. Retrieved from Internet: <https://www.youtube.com/watch?v=7HWXh5eboUl>.

John Lewis Stainless Steel Pole Connector, Dia.25mm, <https://www.johnlewis.com/john-lewis-stainless-steel-pole-connector-dia-25mm/p231617598>, publicly available at least before Aug. 25, 2021, 6 pages.

\* cited by examiner

ROD CONNECTOR SYSTEM AND METHODS OF USE

CROSS-REFERENCE TO RELATED APPLICATION

This application is a continuation of prior application Ser. No. 17/411,763, filed Aug. 25, 2021, which is hereby incorporated herein by reference in its entirety.

FIELD

This disclosure relates to connectors and, in particular, to connectors for joining rods together.

BACKGROUND

Many homeowners place curtain rods above windows to enable curtains to be drawn open or closed over the window to selectively control the amount of light entering a room from outside the home. Curtains may also be drawn closed to inhibit those outside of the home from viewing inside the home through the window. Curtain rods are also often used with showers to hang a shower curtain along an opening to a shower to prevent water from exiting the shower.

Since the curtain rods must span the width of a window or the length of a shower, the curtain rods can be very long. Even where telescoping rods are used, the length of each rod may be very long. As a result, the curtain rods are placed in long boxes for sale, storage, and transportation. Long boxes are more costly to produce, to transport, and to store in a warehouse and consume too much display space in retail stores.

Further, connections can also provide a rough transition between tubes. In many instances, curtains are suspended from the rods using loops and hooks. The loops and hooks have to slide along the rods to open and close the curtain. When there is a rough transition between the rods, the loops and hooks tend to hang up on the transitions as they slide along the rods.

DETAILED DESCRIPTION

A rod connector is provided for coaxially connecting two rods together. The rods may be curtain rods for supporting curtains over a window or shower rods for supporting a shower curtain. The rod connector also may be used, for example, to connect rods used to support a shower caddy, rods of a storage support, and rods of a closet pole (e.g., for hanging clothes). Those having skill in the art will readily appreciate other applications where the rod connector may be used to join two rods together to increase the overall combined rod length. Use of the rod connector enables two rods to be joined together to form a rod having an increased length and smooth transition from one rod to the other. The two rods may be separate when packaged enabling a box having a shorter length to be used which reduces the costs of the box and costs associated with shipping and storing the packaged rod system. The end user or installer may join the two rods together using the rod connector to provide a rod having a desired length, e.g., a length that spans the width of a window or the length of a shower.

The rod connector includes a disc portion that is positioned between the ends of the two rods to be connected. The disc portion has a first side configured to engage a first rod and a second side configured to engage a second rod. A first shaft portion extends from the first side of the disc portion for connection with a first rod. The first shaft portion includes threads along at least a portion of the length thereof for engaging threads within the first rod to draw the first rod into engagement with the disc portion. A second shaft portion extends from the second side of the disc portion for connection with a second rod. The second shaft portion includes threads along at least a portion of the length thereof for engaging threads within the second rod to draw the second rod into engagement with the disc portion. The first and second rods are connected to one another when the first and second rods are threaded on to the first shaft portion and second shaft portion, respectively, such that the first and second rods engage the disc portion. The disc portion creates a smooth transition from one rod to another.

With respect to FIG. 1-5, a rod connector 100 is shown according to a first embodiment. The rod connector 100 includes a connecting disc 102 and a stud 104. The connecting disc 102 includes a disc portion 106 having a central opening 108 through which the stud 104 passes through the connecting disc 102. The stud 104 includes threads 110 disposed thereon for attachment to the rods 112, 114 as described in further detail below. The stud 104 may be formed of a metal (e.g., steel). As one example, the stud 104 has a diameter of 0.25 inches with 20 threads per inch.

Figure 1:
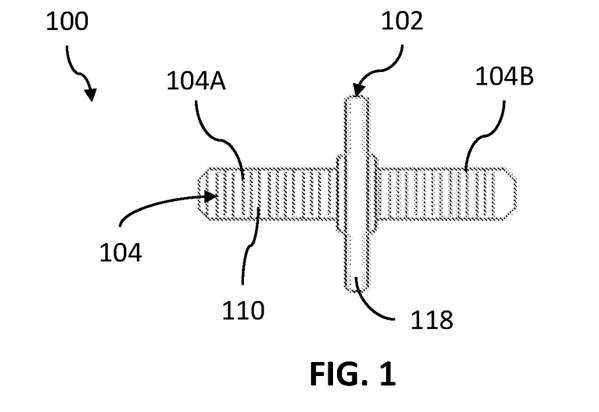
FIG. 1 is a top plan view of a rod connector according to a first embodiment.
Figure 4:
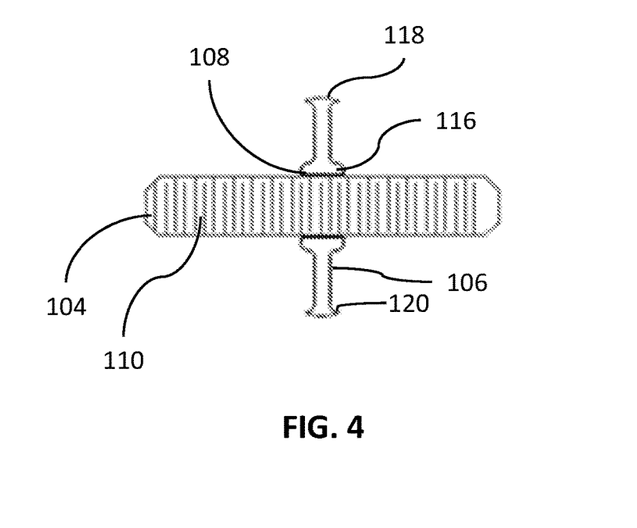
FIG. 4 is a partial cutaway view of the rod connector of FIG. 1.

The central opening 108 of the connecting disc 102 may be sized to slide over the threads of the stud 104 along the length of the stud 104. The central opening 108 may be sized such that the central opening 108 is slightly larger than the threads 110 of the stud 104 so that the connecting disc 102 is maintained on the stud 104 by a friction fit connection. The connecting disc 102 may be positioned at a middle point of the stud 104 such that a first portion 104A of the stud 104 extends from the connecting disc 102 in a first direction and a second portion 104B of the stud 104 extends from the connecting disc 102 in a second direction opposite the first direction. As one example, the central opening 108 may have a diameter of 0.25 inches.

Figure 2:
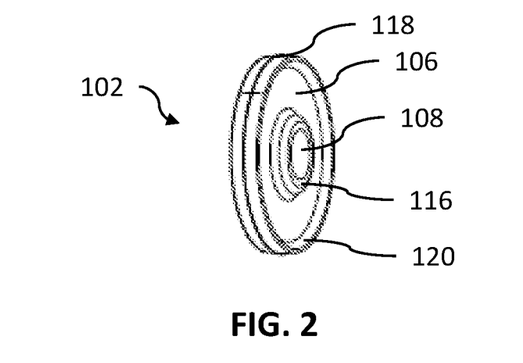
FIG. 2 is a top perspective view of a connecting disc of the rod connector of FIG. 1.
Figure 3:
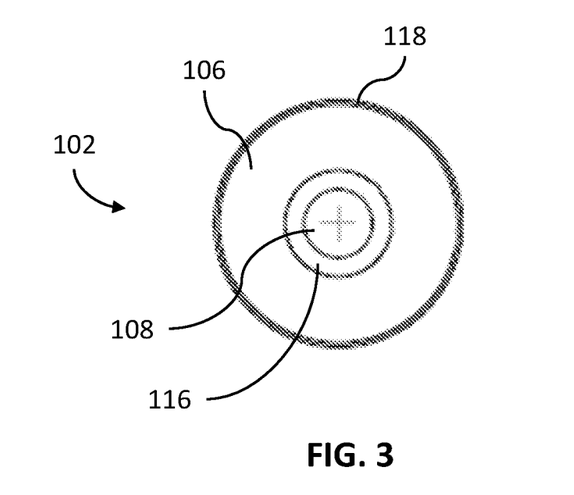
FIG. 3 is a side elevation view of the connecting disc of FIG. 2.

The connecting disc 102 includes a collar 116 about the central opening 108 on both sides of the connecting disc 102. The collars 116 increases the length of the central opening 108 through which the stud 104 passes through the connecting disc 102. The collars 116 may aid to stabilize the connecting disc 102 and maintain the connecting disc 102 in a position substantially perpendicular to the length of the stud 104. The collars 116 further increases the portion of the connecting disc 102 that engages the stud 104 providing for increased frictional resistance between the connecting disc 102 and the stud 104.

In some forms, the central opening 108 of the connecting disc 102 may include complementary threads for engaging the threads 110 of the stud 104 to maintain the connecting disc 102 on the stud 104. The stud 104 may be threaded into the connecting disc 102 until the connecting disc 102 is at the desired position along the stud 104.

The disc portion 106 extends radially outward from the collar 116 to a radial outer edge or outer rim 118. The disc portion 106 is substantially planar and forms a surface for the ends of tubes or rods 112, 114 (see FIG. 5) to contact or abut when connected by the rod connector 100. The outer rim 118 forms a flange 120 about the peripheral edge of the disc portion 106 on both sides of the connecting disc 102. Each flange 120 extends substantially parallel to the length of the stud 104 to form recessed portions for receiving the rods 112, 114 therein.

Figure 11:
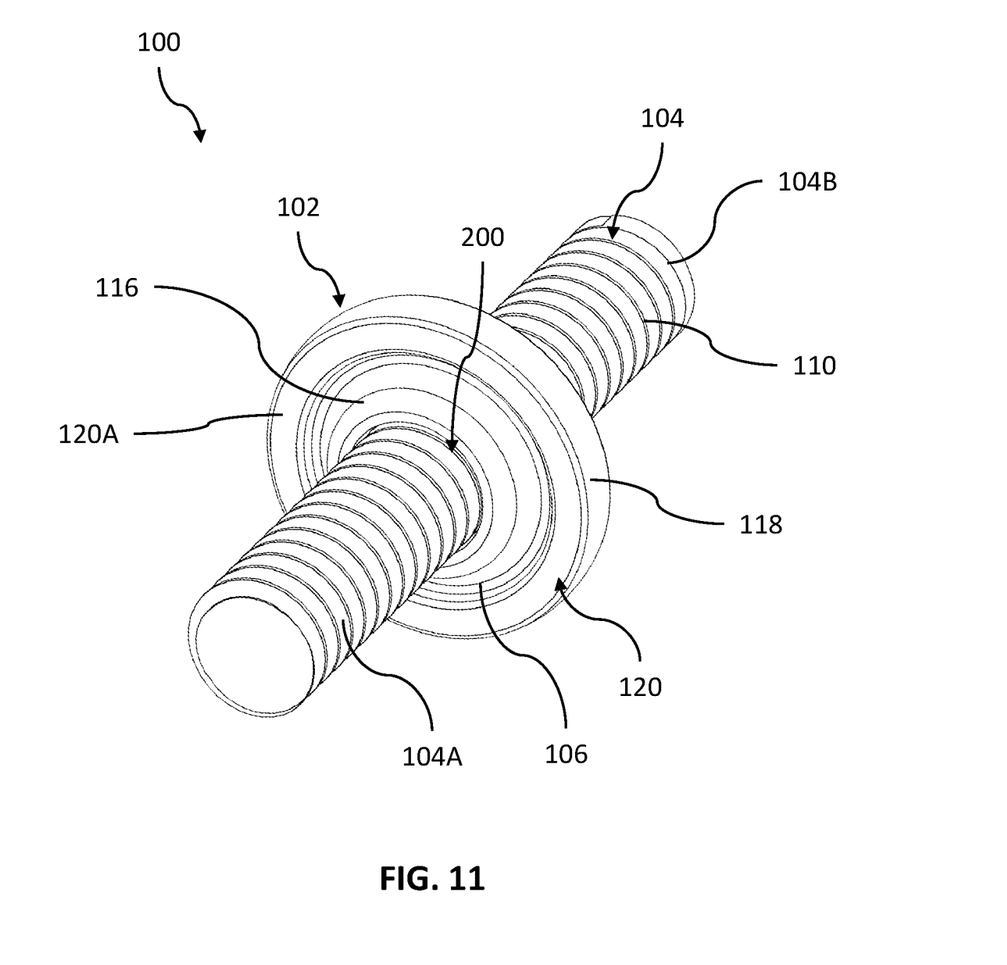
FIG. 11 is a top perspective view of a rod connector according to a third embodiment.

In some embodiments, such as the embodiment in FIG. 11, the flanges 120 form a face against which the end of the rods 112, 114 engage. For instance, an outer portion of the flanges 120 may have an increased radial thickness to provide a face 120A having a larger surface area for the ends of the rods 112, 114 to engage when drawn toward the connecting disc 102. In some forms, the flanges 120 form a surface extending radially inward a substantial or the entire distance to the collars 116. In other forms, the outer diameter of the flange 120 may have the same outer diameter of the rods 112, 114 so that the transition between the rods 112, 114 over the flanges 120 of the connecting disc 102 is smooth. In further forms, the diameter of the flange 120 may be smaller or larger than the outer diameter of the rods 112, 114.

The radial outer surface of the outer rim 118 is rounded or arcuate to create a smooth transition from the first rod 112 over the connecting disc 102 and to the second rod 114. This smooth transitional surface permits or facilitates curtains and/or curtain rings or hooks which support a curtain to pass from the first rod 112 to the second rod 114, and vice versa, without catching on an end of a rod or the connector 100 as the curtains/curtain rings are drawn to one side or the other of the length of the rods 112, 114. The connecting disc 102 may be formed of a plastic material, such as acrylonitrile butadiene styrene (ABS). In other embodiments, the connecting disc 102 is formed of a metal material (e.g., steel, zinc, or aluminum). As one example, the outer diameter of the outer rim 118 is 0.905 inches and the inner diameter formed by the flange 120 is 0.875 inches.

Figure 5:
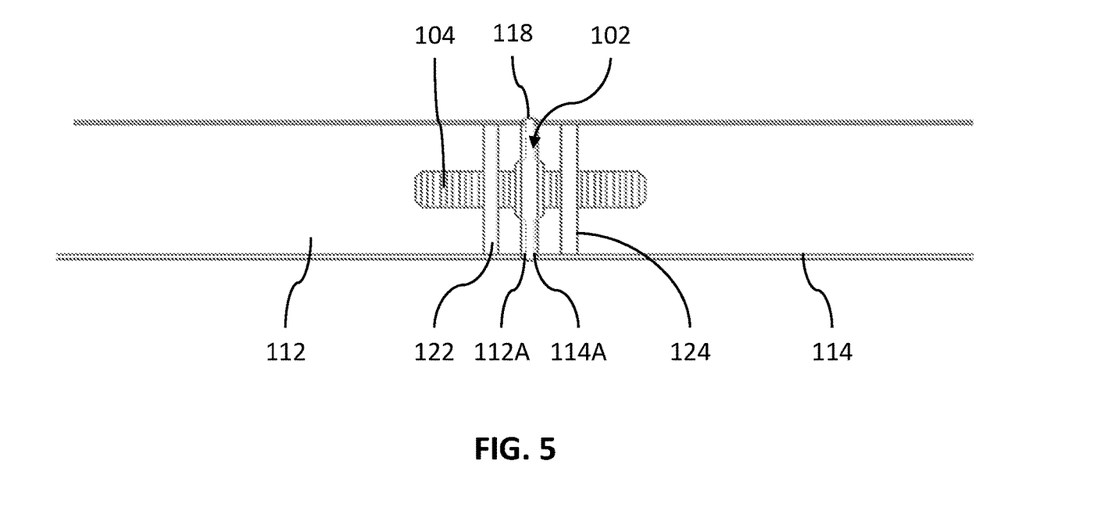
FIG. 5 is a partial cutaway view of the rod connector of FIG. 1 connecting two rods.

With respect to FIG. 5, the rod connector 100 is shown attaching two rods 112, 114 coaxially to one another. As shown, the rods 112, 114 include attachment members or attachment plates 122, 124 positioned at the end of the rods 112, 114. Each attachment plate 122, 124 includes a threaded hole (not shown). The attachment plate 122 is secured in the end of the rod using welding, indentations or any conventional methods. The first portion 104A of the stud 104 is threaded into the threaded hole of the attachment plate 122 until the end face 112A of the rod 112 is brought into contact with the disc portion 106 of the connecting disc 102 and within the flange 120. Likewise, the second portion 104B of the stud 104 is threaded into the threaded hole of the attachment plate 124 until the end face 114A of the rod 114 is brought into contact with the disc portion 106 and within the flange 120.

The outer diameter of the rods 112, 114 may be adjacent and in contact with the radially inner surface of the flange 120. For example, the rods 112, 114 may be ⅞ inch rods configured to be received within the flange 120. The flange 120 spans the gap between the connecting disc 102 and the rods 112, 114. As discussed above, due to the rounded or curved shape of the outer rim 118 of the connecting disc 102, the outer rim 118 creates a ramped or smooth transitional surface from the first rod 112 to the second rod 114 when the rods 112, 114 are connected by the rod connector 100 to permit curtains or curtain rings to pass over the connection interface of the rods 112, 114 with ease.

By use of the rod connector 100, a curtain rod system may include two shorter rods that are easily joined together by the rod connector 100 to form a longer rod upon assembly by the installer or end user. The curtain rod system with shorter rods may be contained, transported, stored, and displayed in a smaller box which reduces the costs of the box, the cost to transport the system, the cost to store the system, and the cost to display the system, all without compromising the functionality and utility of the curtain rod system.

With respect to FIGS. 6-10, a rod connector system according to a second embodiment is shown including a rod connector 200 and attachment members or insert plugs 202. In this second embodiment, the insert plugs 202 are positioned within the end of two rods that are to be connected to one another. The rod connector 200 may thread into the insert plugs 202 within each rod to coaxially connect the rods together.

Figure 6:
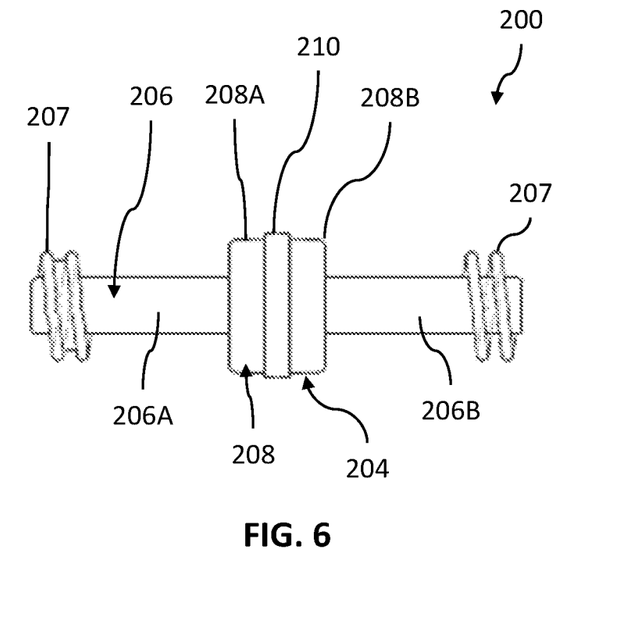
FIG. 6 is a front side elevation view of a rod connector according to a second embodiment.
Figure 7:
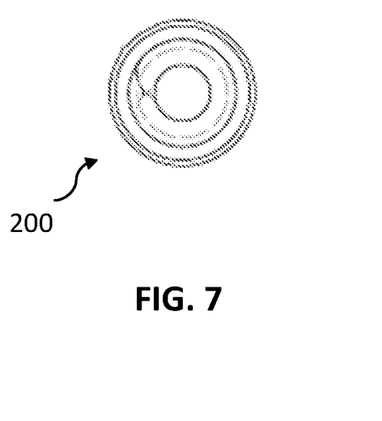
FIG. 7 is a right-side elevation view of the rod connector of FIG. 6.

With respect to FIGS. 6 and 7, the rod connector 200 includes a disc portion 204 positioned along a shaft 206. A first end 206A of the shaft 206 may extend from the disc portion 204 in a first direction and a second end 206B of the shaft 206 may extend from the disc portion 204 in a second direction opposite the first direction. As one example, the rod connector 200 may have length of 2.188 inches.

In some forms, the rod connector 200 is a single piece with the shaft 206 formed integrally or unitarily with the disc portion 204. For example, the rod connector 200 may be a molded or cast component. The rod connector 200 may be formed of a plastic or a metal material (e.g., zinc). In other forms, the disc portion 204 includes a central opening through which the shaft 206 extends similar to that described above with regard to the first embodiment.

Each end 206A, 206B of the shaft 206 include threads 207 for engaging the insert plugs 202 to secure two rods 222, 224 (see FIG. 10) together as described in further detail below. The threads 207 may extend along the entire length of the ends 206A, 206B of the shaft 206 or along a portion of the length of the ends 206A, 206B of the shaft 206 as shown.

The disc portion 204 may include a cylindrical body 208 coaxially aligned with the shaft 206. The disc portion 204 may include a ridge 210 extending annularly about the body 208 and defining a first portion 208A and a second portion 208B of the body 208. The cylindrical body 208 may have a diameter configured to be received within the end of the rods 222, 224 when the rod connector 200 connects the two rods together, with the ridge 210 having a diameter that is larger than the internal diameter of the rods 222, 224. Thus, when connecting two rods together, the rods may extend over the body 208 and abut the ridge 210. As one example, the outer diameter of the cylindrical body 208 has a diameter of 0.6 inches and the outer diameter of the ridge 210 has an outer diameter of 0.65 inches. The ridge 210 creates a smooth transition between the two rods.

Figure 8:
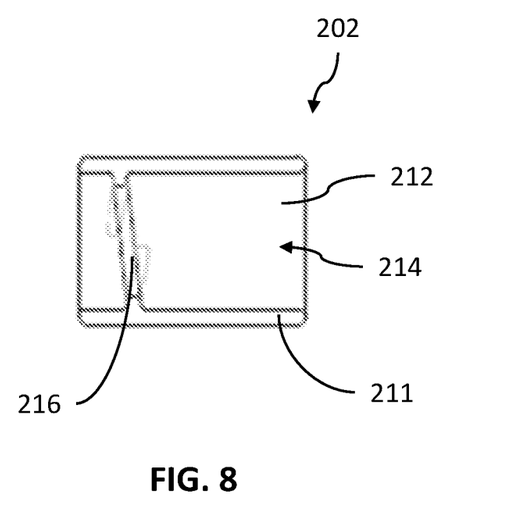
FIG. 8 is a cross-sectional view of an insert plug for use with the rod connector of FIG. 6.
Figure 9:
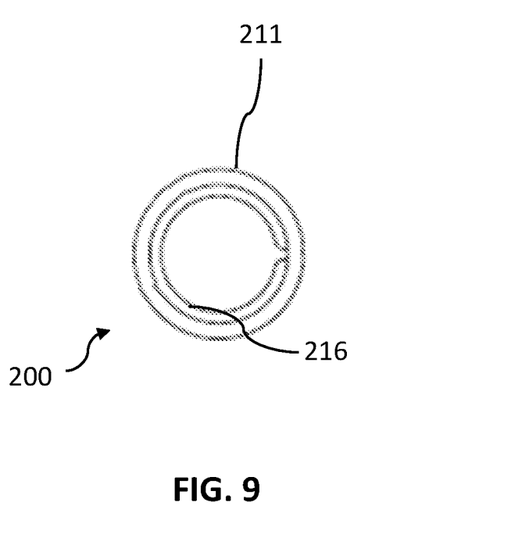
FIG. 9 is a right-side view of the insert plug of FIG. 8.

With respect to FIGS. 8-9, the insert plugs 202 have a substantially cylindrical body 211 having an outer diameter sized to be positioned within an end of a rod 222, 224 and be held within the rod 222, 224 by a friction fit. The outer diameter of the insert plugs 202 may be the same size or slightly smaller than the internal diameter of the rods. The insert plugs 202 may be sized such that insertion into the rods 222, 224 requires substantial force such that the insert plugs 202 are not able to move substantially when the rod connector 100 is used to connect the two rods 222, 224 together. For example, the insert plug 202 may be held in place by a frictional force that is greater than the forces expected to be applied to the insert plug 202 under normal use and application of the rod connector system to prevent the insert plug 202 from moving substantially within the rod. Alternatively, indentations of the rod may be dug into the body 211 to hold the insert plug 202 in place.

The insert plugs 202 include an internal surface 212 that defines a central opening 214 for receiving the shaft 206 of the rod connector 200. The insert plugs 202 include internal threads 216 along a portion or the entire length of the internal surface 212 for receiving and engaging the threads 207 of the rod connector 200.

The insert plugs 202 may be formed of a plastic such as acetal. In one example, the outer diameter of the insert plug 202 is 0.6 inches and the insert plug 202 has a length of 0.8 inches.

Figure 10:
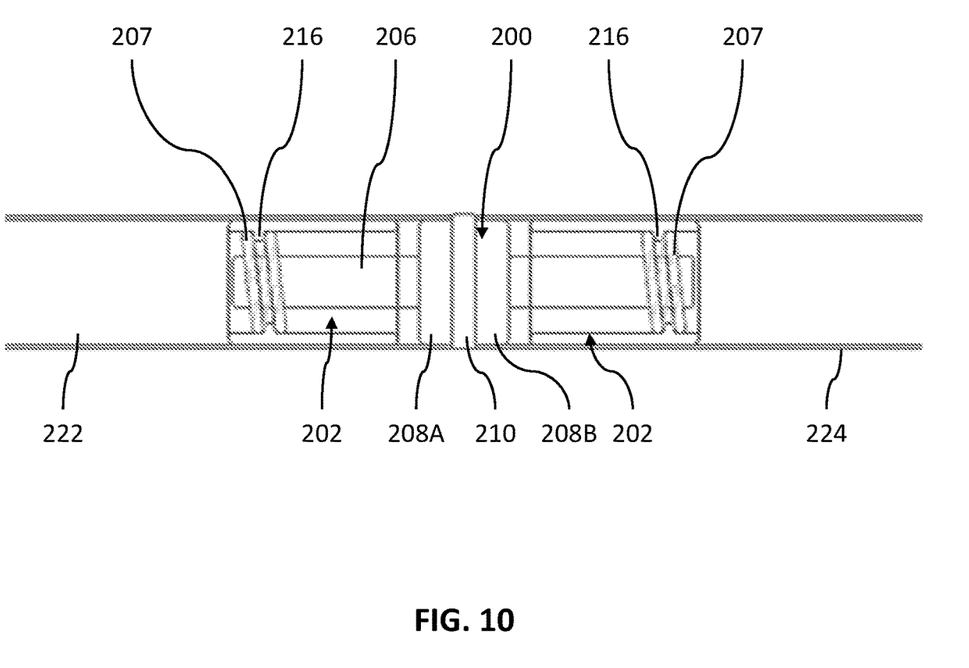
FIG. 10 is a partial cutaway view of the rod connector of FIG. 6 and insert plugs of FIG. 8 connecting two rods.

In use, and with respect to FIG. 10, one insert plug 202 is positioned within an end of a first rod 222 and a second insert plug 202 is positioned within an end of a second rod 224. The threads 207 of each end 206A, 206B of the shaft 206 of the rod connector 200 may be threaded into the threads 216 of the insert plug 202. The rods 222, 224 may be threaded on to the rod connector 200 simultaneously or one rod 222, 224 at a time. The rods 222, 224 may be rotated until the respective ends 222A, 224A of the rod abut or contact the ridge 210 of the disc portion 204. The outer diameter of the rods 222, 224 may be the same or smaller than the outer diameter of the ridge 210 such that the rods 222, 224 are not able to pass beyond the ridge 210. The ridge 210 thus aids to prevent an installer from overtightening the rods 222, 224 on the rod connector 200, which aids in limiting the force applied by the rod connector 200 to the insert plugs 202 held in place by a friction fit. In one example, the rods 222, 224 have an outer diameter of 0.63 inches.

When the rods 222, 224 are connected via the rod connector 200, the first and second portions of the body 208A, 208B of the disc portion 204 may be within the ends of the rods 222, 224. The outer diameter of the body 208 may have a diameter that is the same or slightly smaller than the internal diameter of the rods 222, 224 such that the body 208 engages the rods 222, 224 and aids to maintain the rods 222, 224 in coaxial alignment with one another. The ridge 210 of the disc portion 204 may function similar to the outer rim 118 of the first embodiment, filling the gap between the rods 222, 224 such that a curtain and or curtain hook may slide over the connection point without hooking or snagging the rods 222, 224 or rod connector 200. In some forms, the outer edge of the ridge 210 is rounded or has an arcuate cross-section to form a smooth transitional surface to facilitate movement of a curtain or curtain hook across the connection interface of the rods 222, 224. In some forms, the ridge 210 includes flanges extending over the ends of the rods 222, 224 similar to the flange 120 of the connecting disc 102 of the first embodiment.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A rod connector comprising:
   a disc portion having a first side and a second side;
   a first shaft portion extending from the first side of the disc portion, the first shaft portion including first threading along at least a portion of a length thereof for engaging second threading at a first rod to draw the first rod toward the disc portion; and
   a second shaft portion extending from the second side of the disc portion, the second shaft portion including third threading along at least a portion of the length thereof for engaging fourth threading at a second rod to draw the second rod toward the disc portion,
   wherein the first side of the disc portion includes a first annular flange extending axially from a peripheral edge of the disc portion, and
   wherein the first annular flange is sized to provide a smooth transition between the first annular flange and a portion of the first rod such that one or more couplings of a curtain coupled to the first rod are not stopped by the rod connector when a user pulls the curtain across the rod connector.

2. The rod connector of claim 1, wherein the disc portion defines a passage extending from the first side to the second side and a shaft extends through the passage, the first shaft portion is a portion of the shaft on the first side of the disc portion, and the second shaft portion is a portion of the shaft on the second side of the disc portion.

3. The rod connector of claim 2, wherein the passage includes fifth threading for engaging at least one of the first threading and the third threading.

4. The rod connector of claim 1, including a second annular flange extending axially from a peripheral edge of the second side of the disc portion.

5. The rod connector of claim 1, comprising a first collar extending about the first shaft portion and a planar surface of the disc portion between the first annular flange and the first collar that is contacted by the first rod when the first rod is attached to the rod connector.

6. The rod connector of claim 1, wherein the first annular flange includes an annular face facing axially that the first rod abuts when the first rod is attached to the rod connector.

7. The rod connector of claim 1, wherein the first annular flange is configured to receive the first rod.

8. A rod connector system comprising:
   the rod connector of claim 1;
   a first rod having a first insert disposed in an end portion thereof, the first insert defining a central opening for receiving the first shaft portion of the rod connector, the central opening including second threading for engaging the first threading of the first shaft portion; and
   a second rod having a second insert disposed in an end portion thereof, the second insert defining a central opening for receiving the second shaft portion of the rod connector, the central opening including fourth threading for engaging the third threading of the second shaft portion.

9. A rod connector system comprising:
a rod connector including a disc portion, a first shaft portion extending from a first side of the disc portion, and a second shaft portion extending from a second side of the disc portion, the first shaft portion including first threading thereon and the second shaft portion including second threading thereon;
a first rod having a first insert disposed in an end portion thereof, the first insert defining a central opening for receiving the first shaft portion of the rod connector, the central opening including third threading for engaging the first threading of the first shaft portion; and
a second rod having a second insert disposed in an end portion thereof, the second insert defining a central opening for receiving the second shaft portion of the rod connector, the central opening including fourth threading for engaging the second threading of the second shaft portion,
wherein the first side of the disc portion includes a first annular flange extending axially from a perimeter of the disc portion, the first annular flange having a first annular face facing axially,
wherein an end of the first rod is dimensioned to abut the first annular face when the first rod is attached to the rod connector, and
wherein an outer diameter of the first rod is the same as an outer diameter of the first annular flange so that a transition between the first rod and the first annular flange is smooth.

10. The rod connector system of claim 9, wherein the disc portion defines a central passage and the first shaft portion and the second shaft portion are part of a shaft extending through the central passage.

11. The rod connector system of claim 10, wherein the central passage includes fifth threading for engaging at least one of the first threading and the second threading.

12. The rod connector system of claim 9, wherein the second side of the disc portion includes a second annular flange extending axially from a perimeter of the disc portion, the second annular flange having a second annular face facing axially, and
wherein an end of the second rod is dimensioned to abut the second annular face when the second rod is attached to the rod connector.

13. A method comprising:
providing a rod connector including a disc portion, a first shaft portion extending from a first side of the disc portion, and a second shaft portion extending from a second side of the disc portion, the first shaft portion including first threads and the second shaft portion including second threads,
wherein the first side of the disc portion includes a first annular flange extending axially from a perimeter of the disc portion about a planar portion of the disc portion,
threading the first threads of the first shaft portion into an attachment insert of a first rod to draw the first rod toward the disc portion;
threading the second threads of the second shaft portion into an attachment insert of a second rod to draw the second rod toward the disc portion;
attaching a curtain to at least a portion of the first rod or the second rod with a plurality of couplings that slide on the first rod and the second rod; and
pulling the curtain to move one or more of the plurality of couplings across the rod connector without one or more of the plurality of couplings catching on the rod connector and without a user directly moving the one or more of the plurality of couplings past the rod connector.

14. The method of claim 13 wherein the first annular flange defines a first annular face and the first shaft portion is threaded into the attachment insert of the first rod until the first rod abuts the first annular face.

15. The method of claim 14, wherein an outer diameter of the first rod is the same as an outer diameter of the first annular flange so that a transition between the first rod and the first annular flange is smooth such that that the one or more of the plurality of couplings do not catch on the rod connector during the step of pulling the curtain.

16. The method of claim 13, wherein the rod connector includes a second annular flange extending about the first shaft portion, the planar portion extending between the first annular flange and the second annular flange.

17. The method of claim 13, wherein the first shaft portion is threaded into the attachment insert of the first rod until the first rod abuts the planar portion of the disc portion.

18. The method of claim 13, wherein an outer diameter of the first rod is sized to be in contact with an inner surface of the first annular flange when the first rod is drawn toward the disc portion and the first annular flange is sized to provide a smooth transition between the first annular flange and a portion of the first rod not received within the first annular flange so that the one or more of the plurality of couplings do not catch on the rod connector during the step of pulling the curtain.

19. The method of claim 13, wherein the plurality of couplings are rings or hooks.

* * * * *